United States Patent
Baumann

(10) Patent No.: US 10,578,215 B2
(45) Date of Patent: Mar. 3, 2020

(54) INLINE HIGH-RECOVERY FLOW CONTROL VALVE

(71) Applicant: Hans D. Baumann, W. Palm Beach, FL (US)

(72) Inventor: Hans D. Baumann, W. Palm Beach, FL (US)

( * ) Notice: Subject to any disclaimer, the term of this patent is extended or adjusted under 35 U.S.C. 154(b) by 0 days.

(21) Appl. No.: 15/998,313

(22) Filed: Aug. 6, 2018

(65) Prior Publication Data
US 2020/0041005 A1   Feb. 6, 2020

(51) Int. Cl.
F16K 1/12 (2006.01)
F16K 1/38 (2006.01)
F16K 31/54 (2006.01)

(52) U.S. Cl.
CPC ............ F16K 1/12 (2013.01); F16K 1/38 (2013.01); F16K 31/54 (2013.01); Y10T 137/3367 (2015.04)

(58) Field of Classification Search
CPC ....... Y10T 137/3367; F16K 1/12; F16K 1/38; F16K 31/54
See application file for complete search history.

(56) References Cited

U.S. PATENT DOCUMENTS

| | | | | |
|---|---|---|---|---|
| 2,513,650 A * | 7/1950 | Johnston | ............... | F16K 1/12 137/219 |
| 2,642,890 A * | 6/1953 | Skewis | ............... | F16K 1/12 137/219 |
| 3,198,204 A * | 8/1965 | Parks | ............... | F16K 1/126 137/219 |
| 3,334,647 A * | 8/1967 | Whitelaw | ............... | F04D 27/0215 137/219 |
| 4,565,210 A * | 1/1986 | Heine | ............... | F16K 1/12 137/219 |
| 2005/0150475 A1 * | 7/2005 | Phaneuf | ............... | F02D 9/12 123/184.54 |

FOREIGN PATENT DOCUMENTS

| | | | | |
|---|---|---|---|---|
| EP | 3056739 A1 * | 8/2016 | ............ | F01D 17/105 |
| WO | WO 97/18419 | 5/1997 | | |
| WO | WO-0218773 A1 * | 3/2002 | ............ | F02D 9/12 |

* cited by examiner

Primary Examiner — Mary E McManmon
Assistant Examiner — Kevin R Barss

(57) ABSTRACT

An inline high-recovery flow control valve comprising a tubular housing internally separated into a cylindrical and a contoured diameter section and where the contured portion being subdivided by a reduced diameter bore, a contoured valve plug suitably fastened to a sliding ring which conforms to the cylindrical diameter of the housing, and mechanical means to motivate the ring with attached valve plug to and from the reduced circular bore.

6 Claims, 2 Drawing Sheets

PRIOR ART
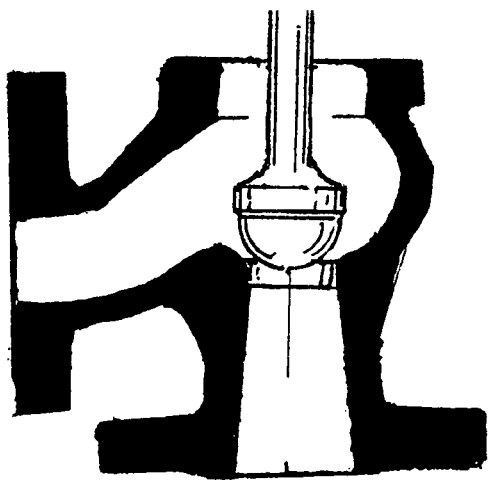
Fig. 4
Fig. 5
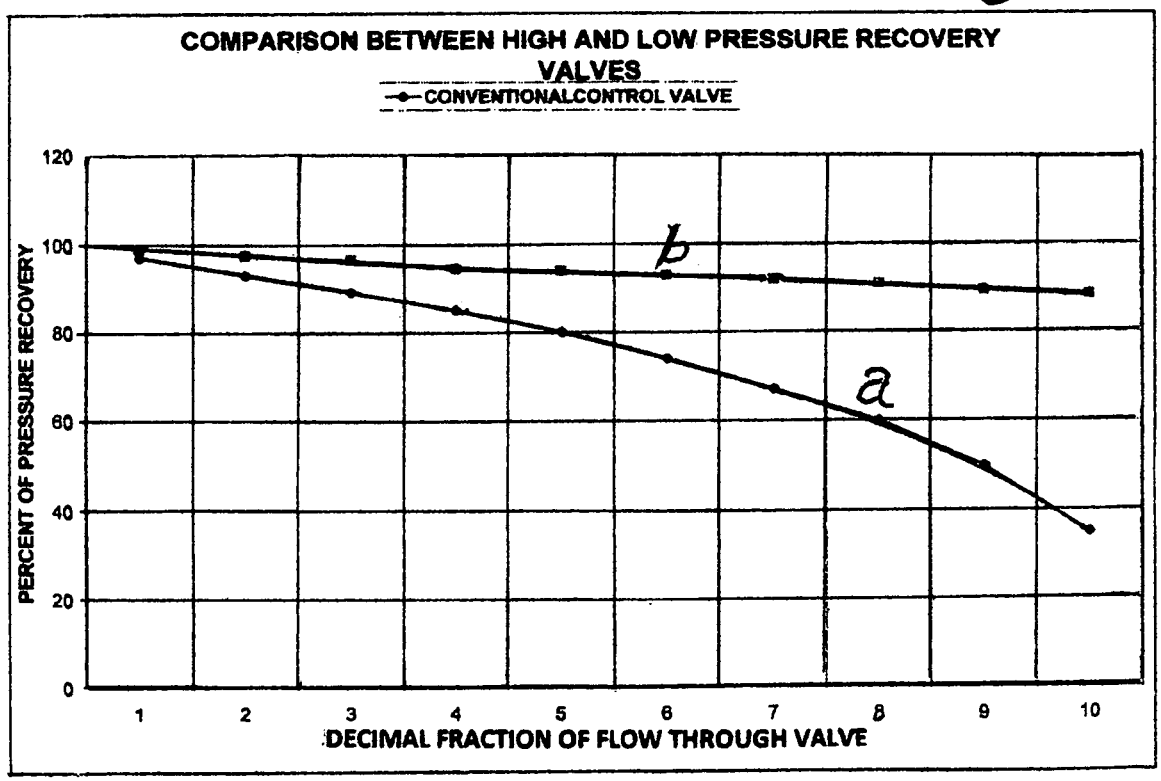

INLINE HIGH-RECOVERY FLOW CONTROL VALVE

INTRODUCTION AND BACKGROUND OF THE INVENTION

This invention relates to automatic control valves utilized in process control in a variety of industries. All such valves operate on the principle of converting potential energy (upstream pressure) into kinetic energy (fluid velocity) which then, depending on the desired downstream pressure, converts kinetic energy into turbulence which magnitude corresponds to the pressure differential across the valve. This process, while effective, is relatively inefficient since it reduces available potential energy downstream of the valve.

Newer valve types (see FIG. 4) try to reduce such energy loss by utilizing venturi type contours downstream of the valves throttling orifice. Here the process is as follows: When sufficient outlet pressure is reduced, the velocity within the throttling orifice reaches sonic velocity, when gaseous fluids are used. The gas now gradually expands within the venturi section until the desired downstream pressure is reached, thus avoiding most of the energy lost due to turbulence. This process is called isentropic recompression. The amount of avoided turbulence depends on how streamlined the fluid path is from the inlet port to the outlet of the valve. This requires that the cross-sectional flow areas have to evenly decrease towards the throttling area and gradually expand thereafter, thus avoiding sudden velocity changes. The prior art, exhibited in FIG. 4, does not fully meet such requirements due to the highly curved inlet section of the valve housing.

In contrast, this invention, being an inline version, avoids this problem and fulfills all of the above requirements. The invention thus is capable of recovering nearly ninety percent of the inlet pressure in contrast to a typical conventional control valve which is able to recover barely thirty-five percent under identical flow conditions, as exemplified in curves (a) and (b) in the attached FIG. 5.

A typical application for this invention, herein called a high recovery valve, is in a fuel control for gas turbines. Here the pressure recovery translates into available calories or heat content of the gas. More available calories downstream of the flow control valve positively affect the turbine efficiency defined as the ratio between thermal energy input and mechanical power output.

Another prior art is exhibited in International Patent number WO 97/18419 showing a Fluid Control Device with Reduced Noise Generation. It shows an inline tubular device having a circular inlet section (24) followed by a curved inlet (62) to an orifice (63) and ending in a venturi shaped outlet (64). Here the fluid passes a large inlet area followed by a sharp acceleration towards the orifice and the gradually slowing down toward the outlet. Such a schema is very beneficial for high pressure reduction of gases normally exhibiting high noise levels which can exceed 100 decibels. The function of the orifice inlet is to produce sonic velocities of the gas. Gradually increasing areas such as shown in the invention are absent, while not required.

Whenever the pressure at the valve orifice recedes below 50 percent of the inlet pressure, the resultant velocity at and beyond the orifice can reach super-sonic speeds of up to Mach 2.6. The result is a pattern of shock waves converting the resulting kinetic energy into heat and a lower downstream pressure through a process called "non-isentropic recompression". While sound power at jet velocities below Mach 1.4 increases to the $6^{th}$ power of the velocity, the sound power only increases to the second power of the Mach number at higher velocities (Reference: Baumann, Hans D. "A Method for predicting Aerodynamic Valve Noise Based on Modified Free Jet Noise Theories", ASME paper; 87-WA/NCA-7)).

In addition, higher velocities create higher sound peek frequencies which reduce pipe external sound by 6 dB for each doubling of the frequency due to higher transmission losses of the pipe wall. One can see from all of this, that it is advantageous for noise reduction to shift jet velocities into higher Mach numbers using venturi type outlets. The aim of this prior art device is opposite of that of the invention. In the invention, pressure losses are avoided at all cost, while the prior art device requires high pressure losses to function properly.

These and other features and advantages are more clearly shown in the following detail description and accompanying drawings.

BRIEF DESCRIPTION OF THE DRAWINGS

FIG. 4 is a schematic view of a state of the art angular shaped control valve featuring a venturi shaped outlet section.

FIG. 5 shows a graphical presentation of the amount of pressure recovery between the invention and a conventional control valve, both having identical flow rates.

DETAILED DESCRIPTION

Figure 1:
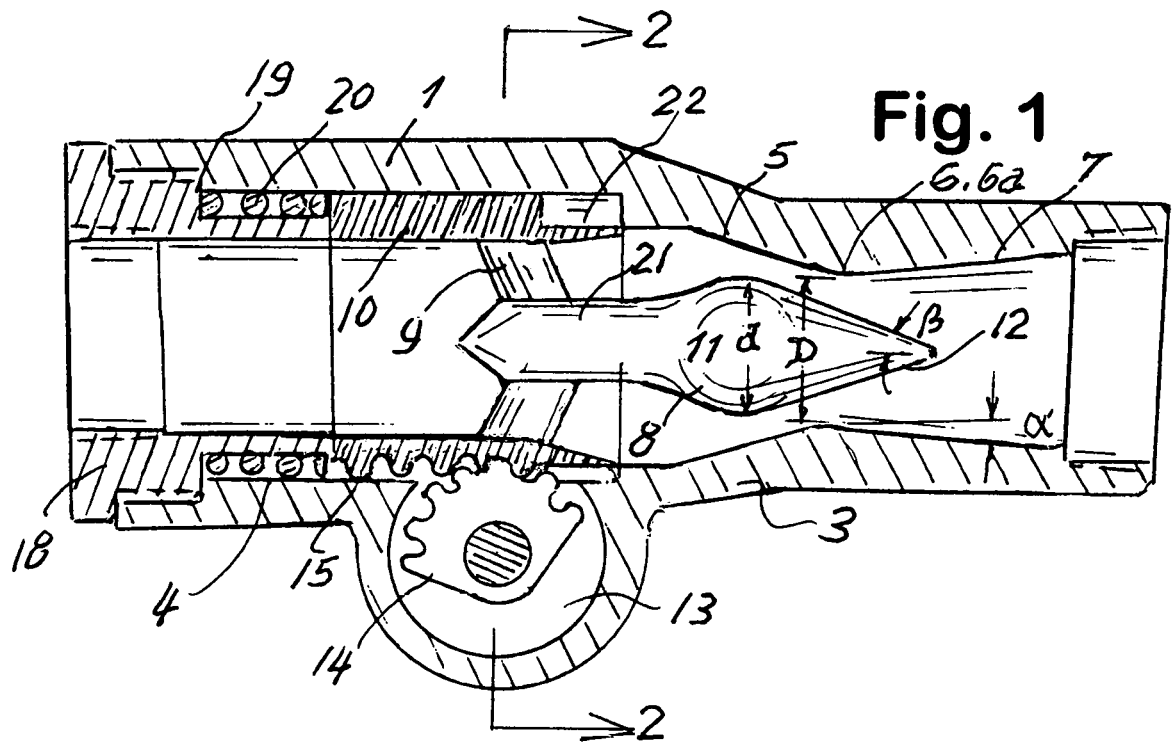
FIG. 1 is a longitudinal sectional view of the invention.
Figure 2:
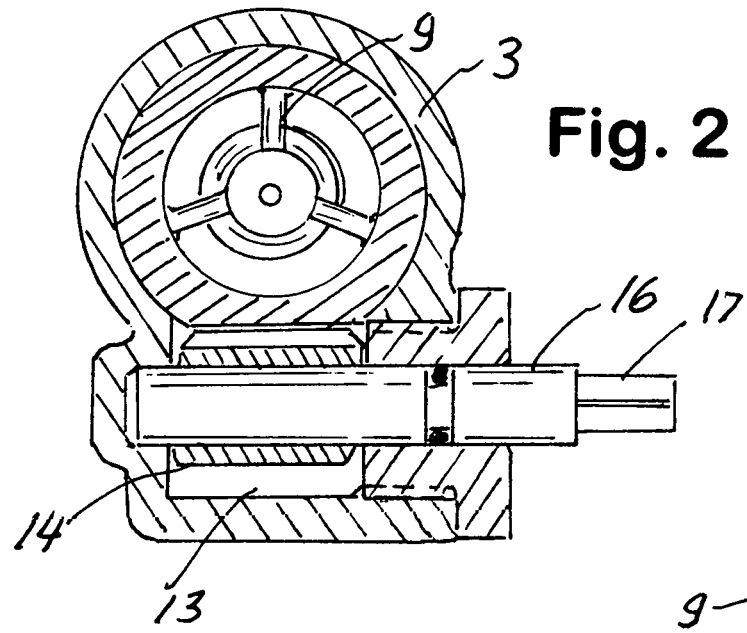
FIG. 2 is a cross-sectional view of the invention when taken along lines 2-2 of FIG. 1.

FIG. 1 showing the invention in a longitudinal sectional view, consisting of a tubular housing (1) having an outer wall (3) and an interior consisting of a straight cylindrical inlet portion (4) followed by a gradually reducing contoured portion (5) terminating in a bore (6) having a slightly curved wall surface (6a).

Extending bore (6) is a conical outlet section (7) having a cone angle $\alpha$. A contoured valve plug (8) fastened by a number of struts (9) to a sliding ring (10) movably engaged inside the straight cylindrical inlet portion (4) and wherein the plug has a spherical diameter portion (11) (identified as d) being sufficiently larger than the diameter of bore (6) (identified as D) in order to provide contact with the slightly rounded wall surface (6a) of bore (6) and herein the spherical diameter portion has an attached conical tip (12) whose cone angle $\beta$ together with the cone angle $\alpha$ of the conical outlet section (7) shall be less than 30 degrees in order to prevent turbulent fluid flow.

Wall portion (3) has an opening (13) containing therein a segmented gear segment (14) which teeth intersect a similar gear segment (15) attached to the sliding ring (10). Gear section (14) is supported by a shaft (16) extending out of opening (13) and is configured (17) to be attached and motivated by a suitable actuating device (not part of the invention).

A retainer (18) threadingly connected to the straight cylindrical inlet portion (4) and having a shoulder (19). A coiled compression spring (20) is placed between the shoulder (19) and one terminating end of sliding ring (10). This allows the compression spring to push the ring with attached plug (8) towards bore (6).

Figure 3:
FIG. 3 is a cross-sectional view showing the shape of struts shown in FIG. 1.

Struts (9) have a streamlined profile as shown in FIG. 3, with the thicker part facing the straight cylindrical portion (4) in order to minimize fluid eddies and turbulence of the passing fluids.

Beginning with a flow area defined by the inside diameter of retainer (18) and followed by a similar inside diameter of ring (10) fluid now passes through the openings restricted by the struts (9) and a reduced diameter section (21) of plug (8) which dimension gradually enlarges towards the spherical diameter portion (11). Fluid area is further restricted by a gradual decease in diameter of contoured portion (5) until a minimum flow area, the point of highest velocity at the closest distance between bore (6) and a portion of conical tip (12), is reached. Fluid then is able to freeing expand into areas define by the inside diameter of conical outlet section (7).

Ring (10) has attached slender extensions (22) intent to cover fluid from entering opening (13). The gradual reduction of flow areas is still maintained when a rotation of gear segment (14) propels ring (10) and plug (8) towards bore (6) until the slightly larger spherical diameter portion (11) touches the inner curved surface of bore (6) and affects termination of fluid flow.

The combination of gradually increasing flow passages from the inlet side together with similar gradually decreasing flow passages at the outlet prevents eddies and turbulences associate with sharp corners or sudden area changes to enable up to ninety percent of the inlet pressure to be recovered as shown in FIG. 5, line "b". These contrasts with substantially less pressure recovery which is typical with conventional control valve configurations, without a conical exit, see line "a" in FIG. 5.

While the design of reference patent WO 97/18419 has a streamlined outlet passage, it lacks no such passage at the inlet side (note blunt angle 58 at the inlet side of his plug 44).

One noteworthy advantage of the invention is, that upon actuator failure plug (8) propelled by conical spring (20) and inlet pressure acting on the upstream side of plug (8) will tend to close bore (6); an important safety feature.

While the invention has been shown in a preferred embodiment, numerous changes can be made, such as replacing the gear segment with a crankshaft co-operating with a slot in the ring, without departing from the scope of the attached claims.

The invention claimed is:

1. An inline high-recovery flow control valve comprising a cylindrical housing having an outer wall and having a straight cylindrical inlet portion followed by a contoured and gradually reducing diameter section terminating in a bore having a slightly rounded inner wall portion, expanding thereafter into a conical outlet section, a valve plug suitably retained by a number of struts connecting to the inner bore of a sliding ring inside the cylindrical inlet portion of the housing and where said plug has an enlarged spherical diameter portion followed by a conical tip and where the shape of the spherical diameter portion in conjunction with the bore can create a desired flow characteristic when motivated in the horizontal axis by mechanical means.

2. An inline high-recovery flow control valve as in claim 1, wherein said mechanical means are capable to motivate said sliding ring and attached valve plug in the axial direction comprising a rotary gear segment inside an opening at the outer wall of the housing and being supported by a shaft, and wherein said rotary gear segment intermeshes with similar gear segment attached to the outer periphery of said sliding ring.

3. An inline high-recovery flow control valve as in claim 2, wherein said housing has a retainer having a shoulder located at the inlet portion of the housing, a coiled compression spring located between the shoulder and one terminating end of said sliding ring and where the coiled spring is capable to exert a force in order to motivate said sliding ring and valve plug towards the bore of the housing.

4. An inline high-recovery flow control valve as in claim 2, wherein one end of the shaft extends out of the opening in the outer wall of said housing and terminates in a shaped configuration capable of being connected to an actuating device.

5. An inline high-recovery flow control valve as in claim 1, wherein the struts are placed in triangular fashion at the inner bore of said rings each strut has a streamlined cross-section and wherein the ratio between the width and thickness of each strut is at least four to one in order to provide the least resistance to fluid flow between the inlet and the outlet of the housing.

6. An inline high-recovery flow control valve as in claim 1, wherein circular flow areas generated between the outer diameters of the valve plug and the corresponding contoured inside diameters of said housing should progressively and evenly be reduced ahead of said bore and shall likewise be evenly and progressively enlarged beyond said bore of the housing, and where the diameter d of the spherical part of plug shall be slightly larger in order to interfere with diameter D of the bore and provide contact with the slightly rounded wall portion of the bore and thus being capable to block passing fluid through said bore.

* * * * *